(12) United States Patent
Le Pennec et al.

(10) Patent No.: US 7,055,175 B1
(45) Date of Patent: *May 30, 2006

(54) METHOD AND SYSTEM FOR GENERATING AND USING A VIRUS FREE FILE CERTIFICATE INTEGRATED WITHIN A FILE

(75) Inventors: Jean-François Le Pennec, Nice (FR); Olivier Hericourt, Cagnes sur Mer (FR); Jacques Fieschi, Saint Lauret du Var (FR)

(73) Assignee: International Business Machines Corporation, Armonk, NY (US)

( * ) Notice: Subject to any disclaimer, the term of this patent is extended or adjusted under 35 U.S.C. 154(b) by 944 days.

This patent is subject to a terminal disclaimer.

(21) Appl. No.: 09/665,627

(22) Filed: Sep. 19, 2000

(30) Foreign Application Priority Data

Jan. 6, 2000 (EP) .................... 00480004

(51) Int. Cl.
  G06F 11/00 (2006.01)
  G06F 11/22 (2006.01)
  G06F 11/30 (2006.01)
  G06F 11/32 (2006.01)
  G06F 11/34 (2006.01)

(52) U.S. Cl. .................... 726/24; 713/175; 713/188

(58) Field of Classification Search ............... 713/155, 713/156, 158, 179, 188, 201–202, 176, 175; 714/38; 705/51, 52; 726/24
See application file for complete search history.

(56) References Cited

U.S. PATENT DOCUMENTS 5,136,647 A * 8/1992 Haber et al. ............... 713/178
5,440,723 A 8/1995 Arnold et al.
5,473,769 A 12/1995 Cozza (Continued)

OTHER PUBLICATIONS

"Neural Networks for Computer Virus Recognition" Tesauro et al., IEEE Expert, vol. 11, No. 4, Aug. 1996, 3 pp.

*Primary Examiner*—Ayaz Sheikh
*Assistant Examiner*—Christian LaForgia
(74) *Attorney, Agent, or Firm*—Ohlandt, Greeley, Ruggiero & Perle, L.L.P.; E. Dwayne Nelson

(57) ABSTRACT

A method and system are disclosed for generating and using a virus-free file certificate integrated in a file. The method, for use in a virus-free certificate authority (102), for generating a virus-free certificate (200) certifying that a file is virus-free includes the steps of: receiving (300) a virus-free certificate request for a file from a server (101) or a client (100) system, said virus-free certificate request including the file for which the virus-free certificate is requested; determining (301) whether a virus-free certificate is integrated in the file; if no virus-free certificate is integrated in the file: determining (305) whether the file is virus-free or not; if the file is declared virus-free by the virus-free certificate authority (102): generating (313, 314) a virus-free certificate (200) including a file signature (207) for certifying that said file is declared virus-free by the virus-free certificate authority (102); integrating (316) the generated virus-free certificate (200) in the file; sending (316) back in response to the virus-free certificate request the file with the integrated virus-free certificate (200). The method for use in a server (101) or client (100) system, for determining that a file is virus-free includes the steps of: determining (401) whether a virus-free certificate (200) is integrated within a file; if a virus-free certificate is integrated within the file: authenticating (415) the virus-free certificate (200), said virus-free certificate including a certificate signature (206); authenticating (407) the file, said virus-free certificate (200) including a file signature (207), said file signature certifying that said file has been declared virus-free by a virus-free certificate authority (102).

22 Claims, 6 Drawing Sheets

U.S. PATENT DOCUMENTS

| | | | |
|---|---|---|---|
| 5,475,753 A * | 12/1995 | Barbara et al. | 713/187 |
| 5,485,575 A | 1/1996 | Chess et al. | |
| 5,572,590 A | 11/1996 | Chess | |
| 5,606,609 A * | 2/1997 | Houser et al. | 713/179 |
| 5,613,002 A | 3/1997 | Kephart et al. | |
| 5,638,446 A * | 6/1997 | Rubin | 705/51 |
| 5,724,425 A * | 3/1998 | Chang et al. | 705/52 |
| 5,892,904 A * | 4/1999 | Atkinson et al. | 713/201 |
| 6,021,510 A * | 2/2000 | Nachenberg | 714/38 |
| 6,058,383 A * | 5/2000 | Narasimhalu et al. | 705/44 |
| 6,092,194 A * | 7/2000 | Touboul | 713/200 |
| 6,094,731 A * | 7/2000 | Waldin et al. | 714/38 |
| 6,154,844 A * | 11/2000 | Touboul et al. | 713/201 |
| 6,275,937 B1 * | 8/2001 | Hailpern et al. | 713/188 |
| 6,301,658 B1 * | 10/2001 | Koehler | 713/155 |
| 6,321,333 B1 * | 11/2001 | Murray | 713/156 |
| 6,577,920 B1 * | 6/2003 | Hypponen et al. | 700/200 |
| 6,892,303 B1 * | 5/2005 | Le Pennec et al. | 713/188 |
| 2003/0110376 A1 * | 6/2003 | Wiener et al. | 713/158 |

* cited by examiner

METHOD AND SYSTEM FOR GENERATING AND USING A VIRUS FREE FILE CERTIFICATE INTEGRATED WITHIN A FILE

This application claim foreign priority benefits under Title 35, United States Code, 119 of European Application No. 00480004.1, filed Jan. 6, 2000, the contents of which are hereby incorporated by reference into this application.

TECHNICAL FIELD

The present invention relates to computer virus and more particularly to a method and system for generating and using a virus-free file certificate integrated in a file.

BACKGROUND OF THE INVENTION

Among all computing and networking security issues, the most important cause of concern does not come from intrusions, but from the widespread proliferation of viruses. Viral infections represent the great majority of all security incidents.

Virus Protection

Virus protection for large organizations has become more and more complex and difficult because of:
  the combined use of heterogeneous systems and practices,
  the widespread use of distributed or client/server systems, and
  the free exchange of data files via network sharing, e-mail, Internet . . .

Until recently, viral infections threatened only data residing on storage media, such as hard drives and floppy disks. However, with the emergence of macro viruses, the threat has spread to applications. Most organizations are not aware of this level of penetration and are not organized to manage and prevent virus attacks. An effective virus protection software must prevent infections rather than simply treating them after they have already occurred. Anti-virus solutions need a uniform plan, with a centralized control, automated virus signature updates, and support for multiple platforms, protocols, and file types.

Computer Viruses

A computer virus is any program created to reproduce itself. A virus reproduces itself by attaching itself to programs, files, or even to boot sectors of disks. A virus is activated when the infected file or disk is opened or accessed. Once a virus resides in a memory, it can attach itself to the next file or disk accessed, and so on. A virus may be designed to do harm. A virus may also have unintended consequences by overwriting important computer information and by causing costly inconveniences to users and network managers. There are four general types of computer virus:
  File Viruses (including macro viruses), which are attached to files;
  Boot sector Viruses in which the boot sectors of floppy or hard disks are infected;
  Master Boot Record (MBR) Viruses which infect the disk master boot record; and
  Multi-partite Viruses that are a combination of a file virus and a boot sector virus.

Virus Disguises

Viruses need to avoid detection in order to succeed in corrupting target computers. Simple viruses, with easily detectable signatures are giving way to more sophisticated virus types:
  Polymorphic Viruses: they change their signature, or profile, each time they are activated so that a fixed signature filter will miss them.
  Stealth Viruses: they attempt to hide their presence by intercepting interrupt services and by feeding back false information to anti-virus products and end users.
  Encrypted Viruses: they are delivered within an encrypted file and are undetectable by a simple anti-virus.

Sources of Infection

Every improvement in network and communication technologies opens new avenues through which viruses can infect your system. Most of former viruses were boot sector viruses, in which the boot sectors of floppy or hard disks were infected.

Macro Viruses

As stated earlier, the creation of macro viruses has changed this environment dramatically. A macro virus is a set of instructions comprising powerful macro routines initially designed for word processing and spreadsheet applications. These macro languages enable a myriad of useful functions which can be imbedded into a document and which can be executed when the document is opened for view or use.

Internet

With the exploding development of the Internet, viruses have catastrophic possibilities. The Internet introduces two different virus threats.
  The first threat is caused by the download of files comprising viruses when these files are browsed or transferred using for instance FTP (File Transfer Protocol) routines. Public shareware (shared software) and executable routines of all types, including formatted presentations, are a growing source of virus infection. Furthermore, new Internet virus threats are beginning to appear in the form of malicious JAVA and Active-X applets.
  The second threat comes from electronic mail (e-mail). Most Internet e-mail systems provide a very rich capability to attach formatted documents to mail sent over the network. These e-mail messages can be broadcast to individuals or groups of individuals with the simple stroke of a key! Infected documents or files can flood a corporate network through gateways and mail servers. As networking, telecommunications, remote access, message systems supporting attachments of all kinds become more and more common, viruses will exploit these new electronic pathways to attack systems that were heretofore unreachable.

Groupware Complications

A third trend in networking also exacerbates the virus threat: the trend towards the deployment of Groupware applications such as Lotus Notes, Microsoft Exchange, Novell Groupwise, . . .

Since the active and repeated sharing of documents over the network is at the core of these applications, they represent a fertile ground for the deployment of macro viruses. A Groupware application not only acts as a repository for shared documents, but, due to its collaborative function, it simultaneously broadcasts files to associated work groups. The broadcast of files significantly multiplies the possibility of accidentally deploying mail infected by attached macro viruses and makes Groupware protection a high priority.

Symptoms of Virus Infection

Most viruses attempt to remain undetected as long as possible to extend their destructive influence. Therefore, most viruses do not produce any recognizable profile or signature that would allow to trap them by scanning the software. However, viruses perform actions that do not look like normal computer operations or user operations. These abnormal actions can be detected by intelligent anti-virus software. Fortunately, many viruses have telltale symptoms and may inadvertently give off signals that can alert users and virus protection software to their presence.

Some of these symptoms include:
Increase in byte length of files,
Alterations of a file's time stamp,
Delayed program loading or activation,
Reduced performance,
Lower system resources, available memory, disk space,
Bad sectors on floppies and hard drives,
Strange or non-standard error messages,
Non-standard screen activity, display fluctuations,
Program inoperability (failing to execute),
Incomplete or failed system boots, and
Uninitiated drive writes.

Anti-Virus Software Overview

Detecting a Virus

Viruses are becoming increasingly sophisticated and, as such, can defeat simpler, single dimension software packages. To be effective, the anti-virus software must include special-purpose, distributed applications. Applications can detect viruses using five distinct methods:

Signature Scanning: This method compares the content of files against a database of virus signatures. This method requires frequent updates of the database to ensure the identification of new and changing signatures.

Integrity Checking: This method compares the profile of current files and disk areas against an archived snap shop of these same items. The detected differences may indicate the presence of a virus. Check summing is the most common type of integrity checking. Unfortunately, integrity checking is generally not effective against modern stealth viruses, so further detecting means are needed.

Heuristic Analysis: An artificial intelligence monitors virus-like behavior, such as trapping certain interrupt services or attempting unlikely actions such as reformatting the hard disk.

Polymorphic Analysis: Polymorphic viruses are difficult to detect because they constantly change their look, particularly when they are encrypted or when they use stealth techniques to hide their presence. A polymorphic analyzer will move any suspect file to a separate, protected, location in the computer and will execute it there to see if it exhibits any virus-like behavior.

Macro Virus Analysis: A specifically designed anti-virus software detects macros in files and tests them before execution.

Archived and Compressed Files

In addition to the support of these five types of virus analysis, an effective anti-virus system must also be able to scan archived and compressed files. Zip (or Pkzip) and Microsoft Compression are the most common tools for archiving and compressing a file. A virus can hide inside a compressed archive, and can remain dormant or unnoticed until the infected file is extracted and released into a system. The minimum for an efficient anti-virus system is to be able to scan most current types of archives to identify viruses stored within the files they contain.

Frequency of Database Signature Update

Finally, the ability of a virus software to prevent virus attacks is determined by its ability to maintain an updated virus signature database. Any anti-virus software must have an associated, easily accessible Web site, or some other online source of information, where regular virus database updates can be retrieved. Products that automate this update process by using an Internet connection to regularly collect new information have a clear advantage in this regard.

Real Time and Scheduled Virus Scanning

Most anti-virus software can perform a scan of a computer in order to detect and possibly treat the viruses found at that time. This process is called scanning. Scanning a computer for viruses can occur:
at regular intervals under the control of a scheduler, or
as an on-demand operation manually executed, or
as an event-activated operation (usually in response to some recognizably "illegal" behavior by a potential virus).

In addition, viruses can be detected in real time, when they are received. This capability is important because if viruses can be detected when they attempt to enter within a system (computer, data repository, server . . . ), then it is possible to prevent them from corrupting other files. Oftentimes, a scheduled scan may occur after a virus has already entered within a computer and has corrupted other files. Obviously, the earlier a virus can be detected, the better.

To be truly useful, an anti-virus software must have the ability to perform all types of scans.

Certificate

A Certificate is a structure that contains a public value (i.e. a public key) associated with an identity. For instance, within a X.509 Certificate, the public key is bound to a "user's name". A third party (a Certificate Authority) attests that the public key belongs to the user. A X.509 Certificate is a very formal structure and comprises different elements:

Subject: This is the "user's name" (the Subject can be any identity value).

Issuer: This is the name of the third party that has issued/generated the certificate. This third party is the Certificate Authority (CA).

Public Key Value: This is the public key of a public/private key pair. An associated field defines the public key algorithm that must be used, for instance a RSA, Diffie-Hellman or DSA public key.

Validity: Two fields are used to define the period of validity (valid from date 1 and valid to date 2).

Serial Number: This field provides a unique Certificate serial number for the issuer.

Signature: The signature is an encrypted digest generated by the Certificate Authority (CA) for authenticating the whole certificate. The digest results from the hashing of the Certificate. The digest is encrypted using the CA private key. The encrypted digest which is the signature, "certifies" that the Subject is the "owner" of the public and private keys.

Certificate Verification

The Certificate needs to be verified to ensure that it is valid. This is a quite complex process. The verification by an end user of a Certificate comprises the checking of the following elements:

Valid (or any) Subject and Issuer names are defined in the Certificate.

The Certificate is not expired (checking of the Validity period field).

The Certificate has not been revoked (this may be determined by obtaining a current Certificate Revocation List from the CA).

The signature on the Certificate is valid (the signature is not verified by using the Certificate's public key but by using the CA public key).

The method for validating the signature is quite simple, and comprises the steps of:

extracting the issuer's name (CA name) from the Certificate;

locating the issuer's Certificate (CA Certificate) or the issuer's public key (CA public key).

checking that the end user's Certificate signature was generated by the issuer (CA) using the issuer's public key (CA public key).

Certificates are generated by a Certificate Authority (CA). Two main methods can be used:

Centralized Generation: The private/public key pair is generated by the end user (defined in the subject field of the Certificate). The public key is directly provided by the end user to the CA software to create a Certificate. The Certificate can be provided to another end user via any suitable channel. The channel does not have to be secure because a Certificate is a self protecting structure (given the CA's signature).

Distributed Generation: The private/public key pair is generated by the end user. The end user requests the CA to build a Certificate including the end user public key. The public key is then sent to the CA for certification. If the request is valid then the CA returns a Certificate associating the user identity with the user public key to the end user.

Of course these two methods can be combined in any system, because trusted CA keys are generated by the Certificate Authority (CA).

OBJECTS OF THE INVENTION

Current anti-virus method are becoming more and more complex due to:
the number of viruses,
the difficulty to find them, and
the fact that their signature can change with time or environment.

Virus are coming from everywhere and especially from the Internet network. The time required to check a disk within a computer system, becomes more and more important. Furthermore, the checking of a disk involves the use of resources which may prevent the normal use of the computer system.

An object of the present invention is to improve current anti-virus methods and to provide a new method using file Certificates similar to X.509 Certificates used to authenticate an identity. A specific process associates a Certificate with a file to speed up and improve the anti-virus processing.

It is another object of the present invention to integrate a Certificate with files in view of simplifying the anti-virus processing of said files.

It is another object of the present invention to validate a file against all known viruses. A Certificate is added to the file. The Certificate includes a signature made by a trusted server. This signature avoids local computer systems to check this file for all existing virus. The trusted server validates the file against all known viruses. This server can use one or several anti-virus checkers. In case of new virus only the certificates are changed or updated. The only process performed by the local computer system is to verify the file against the signature included in the Certificate.

It is another object of the present invention to drastically simplify the computing resources used for virus detection. Files on Web Servers are downloaded with their certificates suppressing the risk of virus. The full anti-virus is done once instead of being done locally on each computer system.

It is another object of the present invention to generate a virus-free Certificate integrated in a file using a trusted Anti-virus Certificate Authentication Server.

It is another object of the present invention to use this virus-free Certificate on a workstation to perform an anti-virus detection.

SUMMARY OF THE INVENTION

The present invention relates to computer virus and more particularly to a method and system for generating and using a virus-free file certificate integrated in a file. The method, for use in a virus-free certificate authority, for generating a virus-free certificate certifying that a file is virus-free comprises the steps of:

receiving a virus-free certificate request for a file from a server or a client system, said virus-free certificate request comprising the file for which the virus-free certificate is requested;

determining (301) whether a virus-free certificate is integrated in the file;

If no virus-free certificate is integrated in the file:

determining whether the file is virus-free or not;

if the file is declared virus-free by the virus-free certificate authority:

generating a virus-free certificate comprising a file signature for certifying that said file is declared virus-free by the virus-free certificate authority;

integrating the generated virus-free certificate in the file;

sending back in response to the virus-free certificate request the file with the integrated virus-free certificate.

The method, for use in a server or client system, for determining that a file is virus-free comprises the steps of:

determining whether a virus-free certificate is integrated within a file;

if a virus-free certificate is integrated within the file:

authenticating the virus-free certificate, said virus-free certificate comprising a certificate signature;

authenticating the file, said virus-free certificate comprising a file signature, said file signature certifying that said file has been declared virus-free by a virus-free certificate authority.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Introduction

Figure 1:
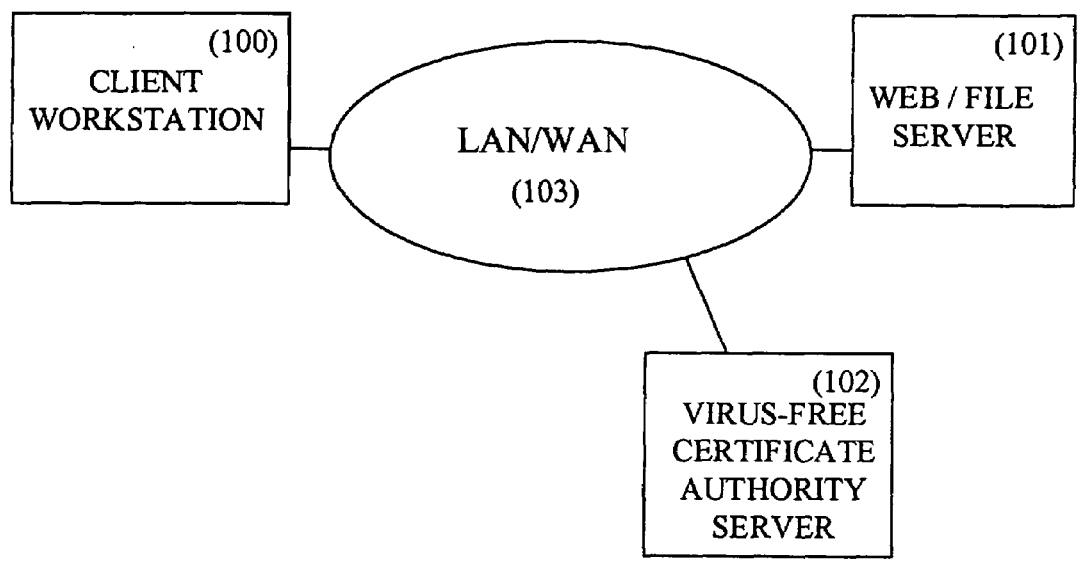
FIG. 1 describes the different entities involved in the anti-virus system according to the present invention.

FIG. 1 describes the different entities involved in the anti-virus system disclosed in the present invention. In most of the cases, the file that the Client Workstation (100) requires, is stored in a Web/File Server (101). A Certificate, stored in a directory within the Web/File Server (101), is associated with this file. The Certificate is provided by a Virus-Free Certificate Authority Server (102) after request. Said request is sent by the Web/File Server (101) to the Virus-Free Certificate Authority Server (102) through a LAN/WAN (Local Area Network/Wide Area Network) (103) which can include the Internet network. The Client Workstation (100) then downloads both file and associated Certificate in a directory and asks its anti-virus program to check the file. This checking process does not use any standard anti-virus program but is based on the previously downloaded Certificate. The only verification required for determining whether the file is virus-free or not, is the verification of the signature comprised in the Certificate. All the above mentioned method will be better understood with respect to FIGS. 2, 3, 4, and 5.

Virus-Free Certificate

Figure 2:
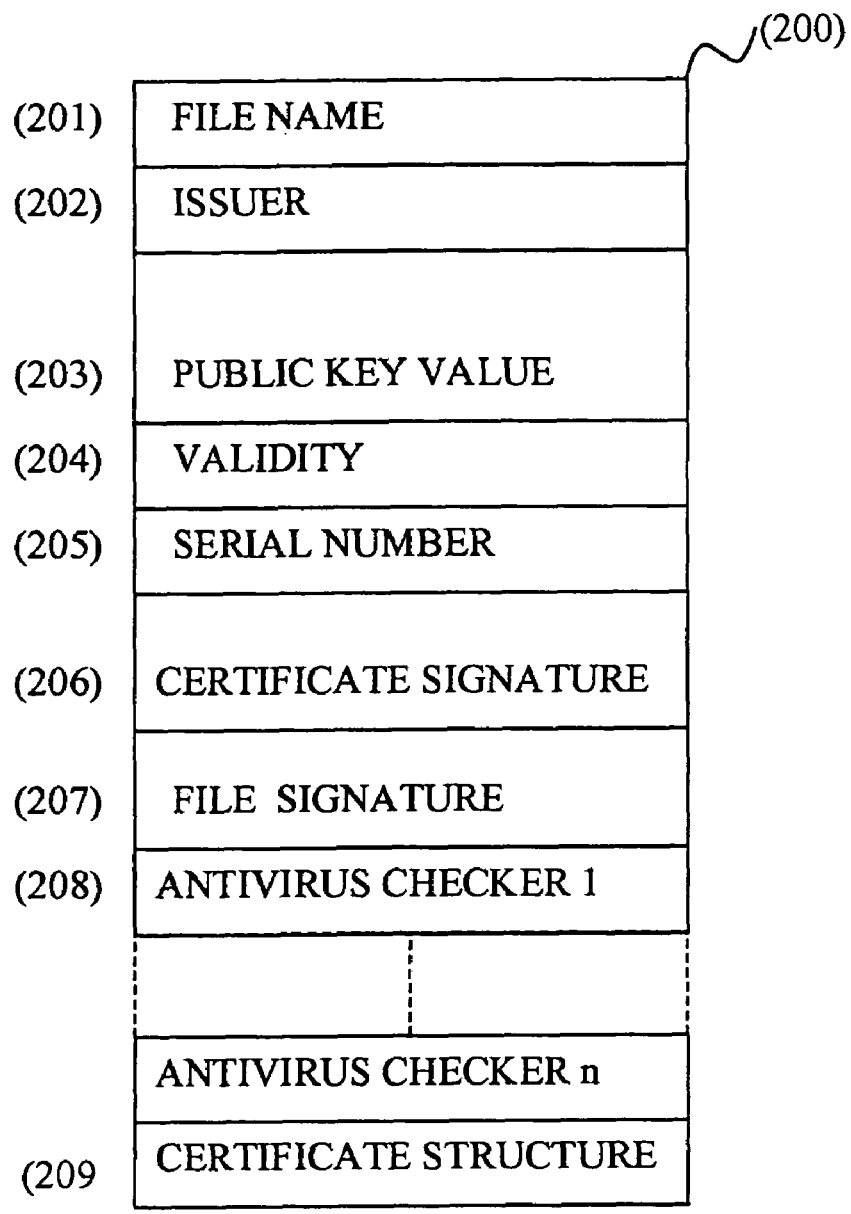
FIG. 2 describes the content of a virus-free Certificate according to the present invention.

FIG. 2 describes the content of a virus-free Certificate according to the present invention. The virus-free Certificate reuses the standard X.509 certificate format. It contains the signature of the file and therefore is bound to this file. The main difference between a X.509 Certificate and the virus-free Certificate is that the virus-free Certificate comprises:
an anti-virus name and level;
a signature of the file.

The virus-free Certificate (200) includes the following fields:
File name (201): This is the "name" of the file protected that the virus-free Certificate protects.
Issuer (202): This is the "name" of the third party that issued/generated the virus-free Certificate. This third party is the Virus-Free Certificate Authority (VCA).
Public Key Value (203): This is the public key of a public/private key pair. An associated field defines the public key algorithm that must be used to check the file signature, for instance a RSA, Diffie-Hellman or DSA public key. The public key is provided by the Virus-free Certificate Authority (VCA) which uses the corresponding private key to build the signature of files. So the same couple private/public key may be used to build several certificates from the same issuer. The public key provided within the certificate is preferably used instead of the Virus-free Certificate Authority public key which is used to validate only the present certificate signature and not the file signature. A public key for decrypting the imbedded signature is added within the virus-free Certificate because the Virus-free Certificate Authority public key is generally longer and more complex. The validity of keys may also differ between the Virus-free Certificate Authority public key and the virus-free Certificate public key. Anyway, because the virus-free Certificate is signed by the Virus-free Certificate Authority, the use of the virus-free Certificate public key is secure.
Validity (204): Two fields are used to define the period of validity (valid from date 1 and valid to date 2).
Serial Number (205): This field provides a unique virus-free Certificate serial number for the issuer.
Certificate Signature (206): The certificate signature is an encrypted digest generated by the Virus-free Certificate Authority (VCA) for authenticating the whole Certificate. The digest results from the hashing of the virus-free Certificate. The digest is encrypted using the VCA private key. The certificate signature results from the encrypted digest and "certifies" that the file signature is encrypted by the private key associated with the virus-free certificate public key (203). The VCA public key is different from the virus-free certificate public key and is either preloaded in the web browser or given by a trusted entity. The VCA public key is used to retrieve the original hashing of the full certificate. The Virus-free Certificate Authority (VCA) can use the same set of virus-free certificate private/public keys (203) for all the files generated during a given period of time so the cross-checking of the issuer authentication can be easily performed time to time, when a new set of keys are used. Once the virus-free certificate public key for a issuer is validated it can be reused for several files certified by the same issuer which reduce the number of virus-free Certificate public keys to store:
File Signature (207): The File Signature is verified using the public key value given in the virus-free Certificate
Anti-virus Checker (208): This field gives an indication of how the virus-free Certificate has verified that the file was virus-free. The Anti-virus Checker comprises the name and the level of the anti-virus program. Several anti-virus programs and levels may be appended to reinforce the efficiency of the anti-virus detection.
Certificate Structure (209): This field describes the size and the content of the virus-free Certificate fields. The number or anti-virus program is defined in this field.
If the virus-free Certificate uses a standard format (minimum size of a virus-free Certificate), this field is optional.
If the size of the virus-free Certificate is above the size of the standard format (above the minimum size), this field is mandatory and defines the size of the fields comprised in the virus-free Certificate.

Virus-Free Certificate Generation

Figure 3:
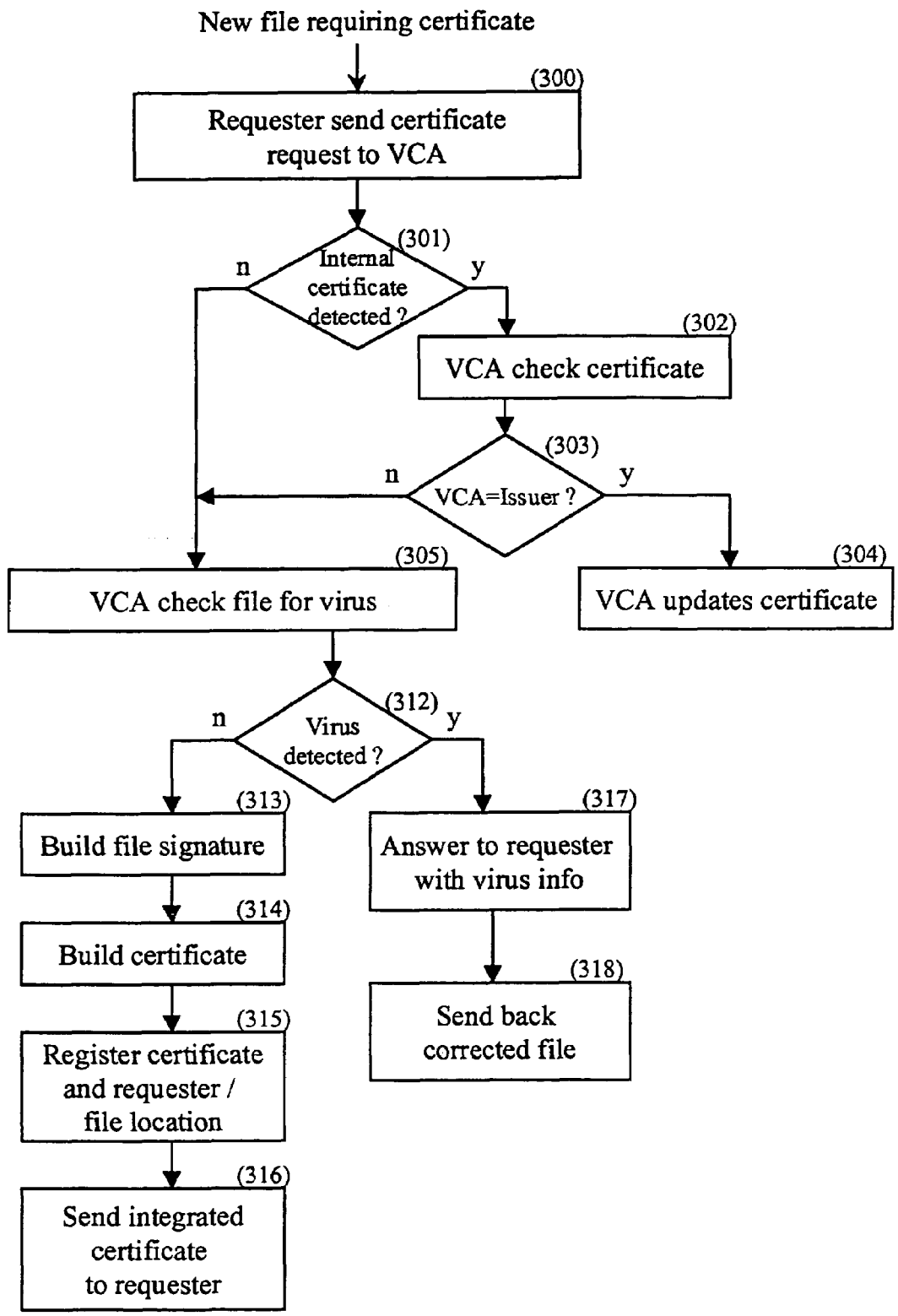
FIG. 3 is a flow chart of the method of requesting and generating a integrated virus-free Certificate for a file according to the present invention.

FIG. 3 describes the process of requesting a virus-free Certificate for a file located on a Web Server or on a File Server (101). Nothing prevents workstations (100) to request a Certificate Authority (102) to build virus-free Certificates in real time but the most appropriate way to do is to let the Web/File Servers (101) send requests to the Certificate Authority (102) to build virus-free Certificates and to let them store the files with their associated anti-virus Certificate. The method of requesting and generating a virus-free Certificate comprises the following steps:
(300) When a new file requires a virus-free Certificate, the requester, Web/File Server (101) or workstation (100), sends a virus-free Certificate request message to a Virus-free Certificate Authority (VCA) Server (102). Either the file is sent to the Virus-free Certificate Authority (VCA) Server (102) in addition to this request message or the checking/signature is done on the Web/File Server (101) or workstation (100) where the file is stored. The request may specify the anti-virus checking method or the use of a particular anti-virus program.

(301) A Virus-free Certificate Authority (VCA) determines whether a virus-free Certificate integrated in the file for which a certificate is requested or not:

If no virus-free Certificate is detected within the file, the process goes to step (305).

if a virus-free Certificate is detected within the file, the process goes to step (302).

(302) The VCA reads the virus-free Certificate.

(303) The Issuer name and the current VCA name are compared:

(304) If the issuer name of the integrated certificate is the same as the current VCA name then the virus-free Certificate is updated depending on the request performed.

If the certificate was built by another VCA corresponding to a different issuer name, the process goes to step (305).

(305) The Virus-free Certificate Authority (VCA) Server starts by checking the file.

(312) The Virus-free Certificate determines whether the file is virus-free or not:

If a virus is detected, (317) the VCA Server answers the requester with an information concerning the detected virus.

(318) Eventually, the VCA Server sends back to the requested a corrected file.

If no virus is detected, (313) A file signature of the file is established.

(314) The virus-free Certificate is prepared with this file signature.

(315) The virus-free Certificate and the requester identification, are then stored in the VCA. The requester identification may include the file location within the Web/File Server or workstation. The file location is useful when the requester needs a regular and automatic update of the virus-free Certificate (for instance, when the virus-free Certificate expires or when a new level of anti-virus program is provided). In that case the VCA can access the file and can update the virus-free Certificate without any action from the Server or workstation. This is the case when the virus-free Certificate expires or when a new level of anti-virus program is provided. Finally the virus-free Certificate is sent to the requester. A batch process may regularly update all files within a server (by simple scanning of the database).

(316) Finally, the integrated virus-free Certificate is sent to the requester.

For a better understanding, the VCA is shown in the present embodiment as an independent Server. However, the VCA can be located within a Web/file Server (101). It is possible for a master Certificate Authority server to delegate virus-free Certificate establishment to trusted servers or workstations.

Virus-Free Certificate Utilization

Figure 4A:
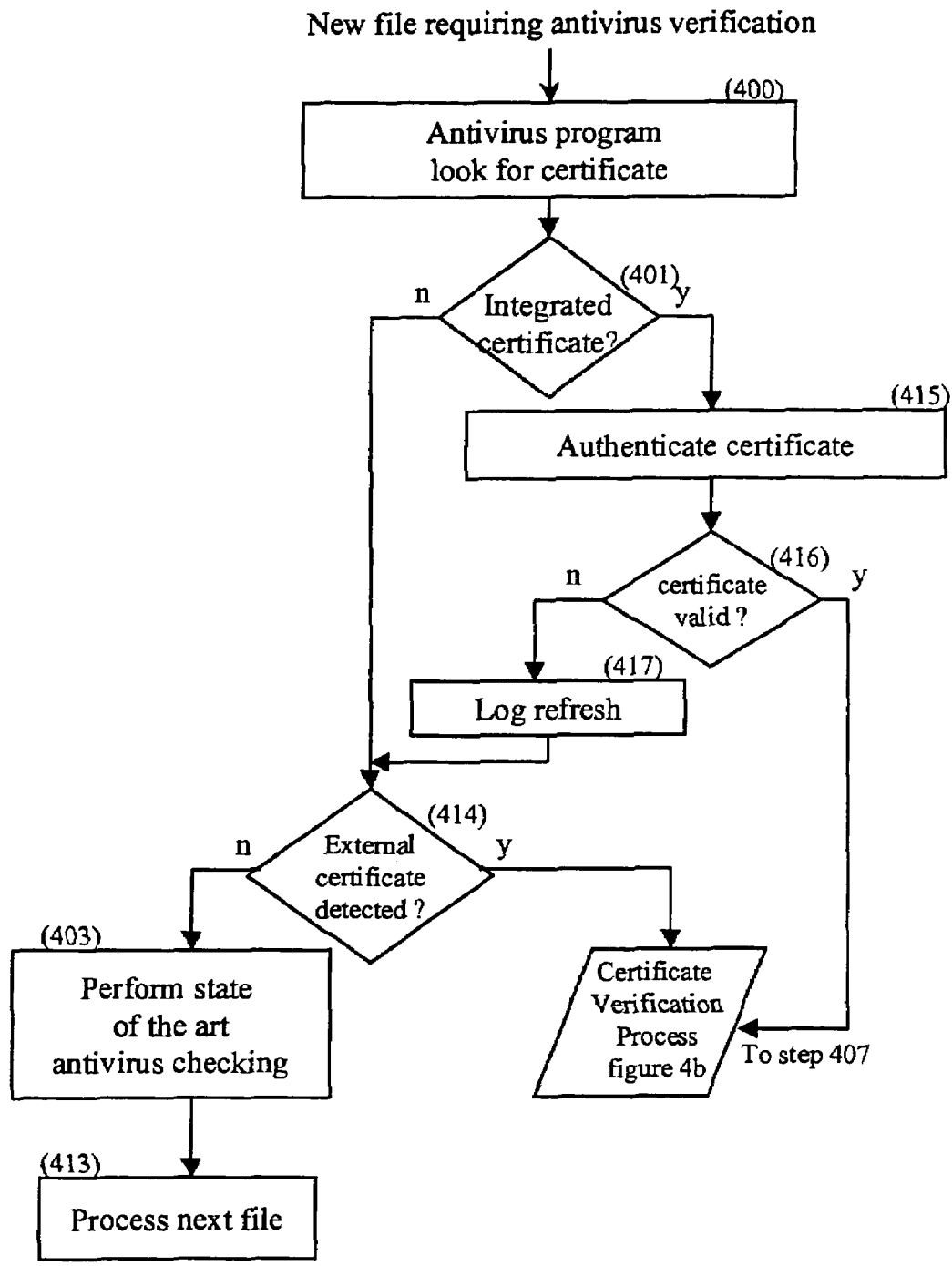
FIGS. 4a and 4b are flow charts of the method of using a virus-free Certificate in a workstation according to the present invention.
Figure 4B:
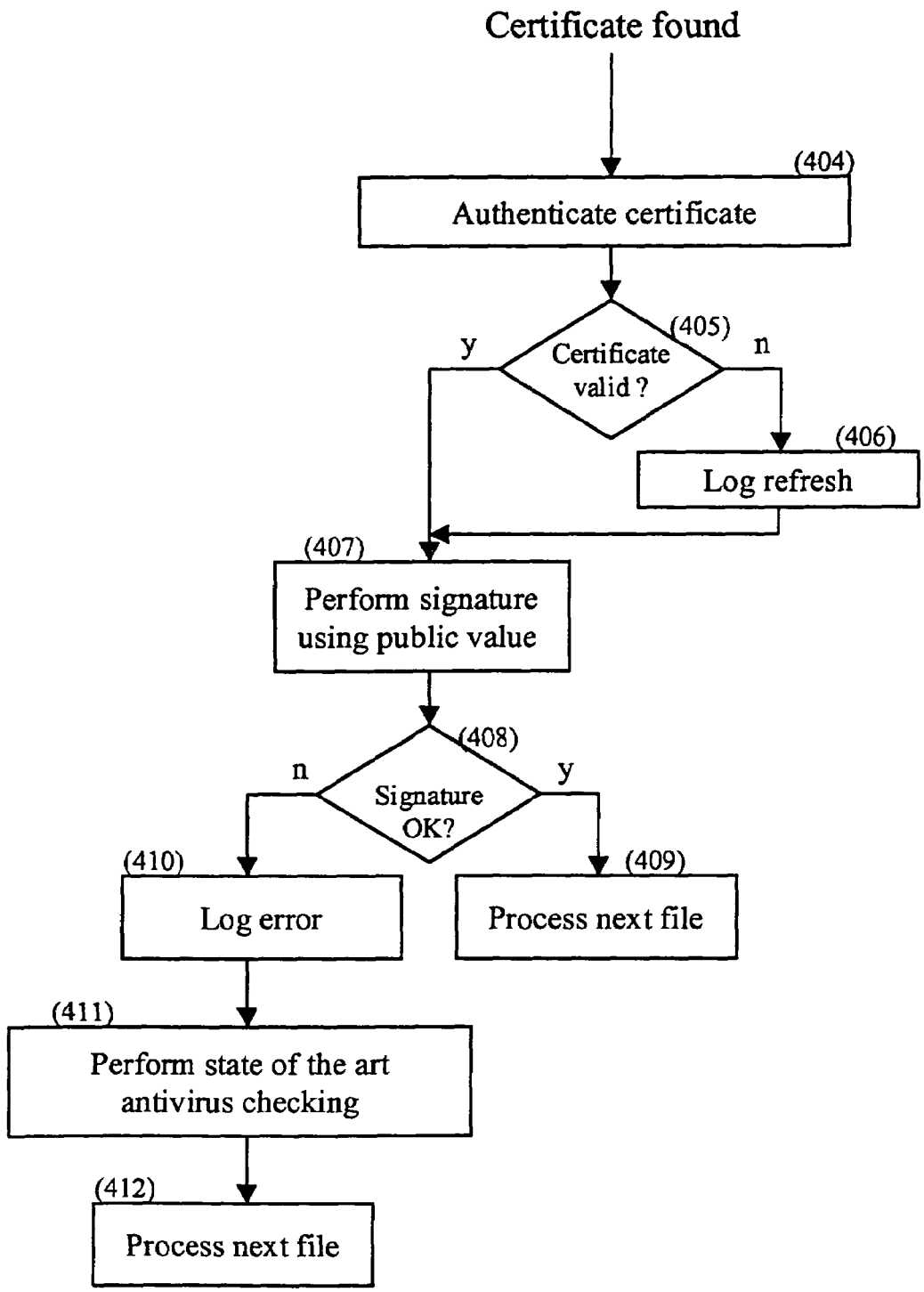

FIGS. 4a and 4b describe the process of using the virus-free Certificate in a workstation according to the present invention. A File is downloaded with its free-virus Certificate onto a workstation. The anti-virus program performs a checking on this incoming file. The anti-virus program can also check all files assigned by configuration. Some files may have an associated virus-free Certificate, other files may have no Certificate. The present method of a using a free-virus Certificate in a workstation comprises the following steps:

(400) When scanning files, the anti-virus program is activated to take into account virus-free Certificates. The anti-virus program first looks for the virus-free Certificate associated with the file to check. The virus-free certificate may be either a certificate integrated in the file or a certificate external to the file. If the virus-free certificate is external to the file, it may be in the same directory as the file or in a specific directory with all free-virus Certificates. Other settings may be defined but the two settings above are the these used in the present embodiment.

(401) The virus-free program looks for the integrated virus-free Certificate:

If an integrated virus-free Certificate for this file is not found:

The program goes to step (414)

If an integrated virus-free Certificate is detected:

(415) the program proceeds to the virus-free Certificate authentication and more particularly validate the issuer field (202). The expiration date in the validity field (204) and the list of anti-virus programs (208) are also checked.

(417) If one of the above test fails, a log is done and the process continues to step 414 as if no integrated virus-free Certificate was found.

If all the virus-free Certificate parameters meet the requirements, the virus-free Certificate verification process continues on step 407 (FIG. 4b) where the signature is validated.

(414) the program looks for an external virus-free Certificate:

If such external virus-free Certificate is detected the program continues on step 404 (FIG. 4b).

If no external virus-free Certificate is detected, the process continues on step 403.

(403) The process goes on as described in the background art.

(413) The process goes on by checking the next file.

If the virus-free Certificate for this file is found:

(404) The virus-free Certificate is authenticated using the certificate signature and the VCA public key. The VCA public key is in the workstation or if not must be retrieved through a secure channel. The VCA server may be authenticated by another CA having the required public key.

(405) Date of expiration, issuer name (CA name), in addition to the certificate signature determined in the previous step (404) are checked and validated. The anti-virus program may also be checked and in particular levels used to build the Certificate which may or may not be accepted by the local anti-virus program depending on predetermined rules.

(406) If the virus-free Certificate is not valid or authenticated with some obsolete or non matching rules, a log is performed in order to process on real time or on batch mode a refresh action on the VCA to update the Certificate in order to match the rules and dates. When received the new Certificates will allow to process again these files for anti-virus checking.

(407) If the virus-free Certificate is fully authenticated, the file signature is verified using the public value key included in the virus-free Certificate. The public value key must match with the file signature also included in the virus-free Certificate.

(408) The file signature is checked.

If the file signature is OK, (409) The next file is checked.

If the file signature is not OK, (410) A log error is performed.

(411) The normal anti-virus program is activated to check this suspect file.

(412) Finally, the next file is checked.

The Log Error file is processed at the end of the file checking and may ask the VCA to check the file again in order to produce another virus-free Certificate. If a virus is found on this file, the security administrator will retrieve all available information to understand where the virus was introduced, who introduced it . . .

File Structure

Figure 5:
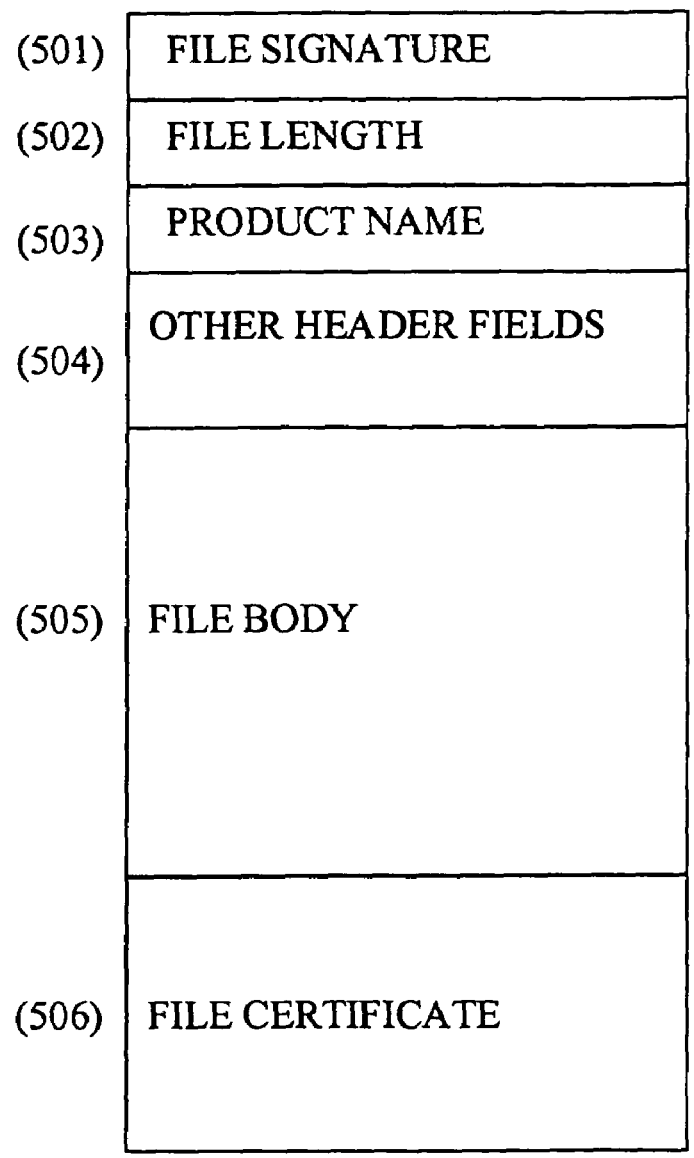
FIG. 5 describes a file comprising a virus-free certificate.

FIG. 5 describe the structure of a file according to a preferred embodiment of the present invention. A file, such as a Microsoft Windows file, comprises internal fields for identifying the file such as:

version, product name, or organization.

These fields are fully visible from the user display by looking at the "file properties" icon. This fields may be used to show that a virus-free Certificate is included in the file. For example the product name may be a standard name with an additional element such as "+AVC" (for Anti-Virus Certificate) informing the user that a virus-free Certificate is included at the end of the file.

The beginning of the file generally comprises the file header which includes among other information the file signature, the file length, the header size, and the program entry point for executable files.

Some of these fields must be updated to take into account the file size modification and the file signature change.

FIG. 5 represents a file structure comprising a field (506) with a virus-free Certificate. In a preferred embodiment, this virus-free Certificate is created and placed at the end of the file after the file body (505). Three fields in the header fields are modified to take into account the addition of a virus-free Certificate field:

(503) Product name to inform user or application that a virus-free Certificate is appended to the file, (502) File size to reflect the new file size by simply adding the normal file size with the virus-free Certificate size, (501) File signature which should be recalculated.

Other header fields (504) have not to be modified. However some fields may be modified, for example the file version may be used to reflect the method of adding the virus-free Certificate.

An alternate method to inform a user or application that a virus-free Certificate is integrated in a file is to set the file signature to zero. This zero value is not a valid file signature but indicates the presence of an integrated virus-free Certificate. The file signature needs to be verified using the file signature integrated in the virus-free Certificate.

Advantages

The proposed invention provides a better and faster way for detecting viruses in files.

Servers offer a better security for all the files they send to their clients.

The full anti-virus checking is performed once on the Virus-free Certificate Authority (VCA) Server.

A method for updating virus-free Certificates is provided.

Normal anti-virus processes may be used as backup and may handle files without Certificate. The compatibility with existing anti-virus programs is easy because a software supervisor can:

verify virus-free Certificates for files having one, and rely on and call any anti-virus program to perform a state of the art virus detection for other files.

Integrated and external virus-free Certificates are both supported and can coexist.

Integrated virus-free Certificates are easier to manage than external virus-free Certificates because they do not need to be separately managed.

The present invention is for users, in line with current security strategies based on Certificate Authority and Certificates, and for files, an extension that can be easily deployed.

Some files may take advantage of having an integrated virus-free Certificate. For instance, a virus-free Certificate for executable files is always requested because the risk of having a virus on these files is very important.

While the invention has been particularly shown and described with reference to a preferred embodiment, it will be understood that various changes in form and detail may be made therein without departing from the spirit, and scope of the invention.

The invention claimed is:

1. A method, for use in a virus-free certificate authority, of generating a virus-free certificate certifying that a file is virus-free comprising the steps of:

receiving a virus-free certificate request for a file from a server or a client system, said virus-free certificate request comprising the file for which the virus-free certificate is requested;

determining whether a virus-free certificate is integrated in the file;

if no virus-free certificate is integrated in the file:

determining whether the file is virus-free or not;

if the file is declared virus-free by the virus-free certificate authority:

generating a virus-free certificate comprising a file signature for certifying that said file is declared virus-free by the virus-free certificate authority;

integrating the generated virus-free certificate in the file;

sending back in response to the virus-free certificate request the file with the integrated virus-free certificate.

2. The method according to claim 1 wherein said file comprised in the virus-free certificate request comprises:

an integrated virus-free certificate.

3. The method according to claim 1 comprising the further steps of:

if the file comprises an integrated virus-free certificate:

determining whether the virus-free certificate integrated in the file has been previously generated by the virus-free certificate authority;

if the virus-free certificate integrated in the file has been previously generated by the virus-free certificate authority:

updating the virus-free certificate;

if the virus-free certificate integrated in the file has not been previously generated by the virus-free certificate authority:

generating a new virus-free certificate.

4. The method according to claim 1 wherein said file further comprises:

a file header comprising:

a non encrypted file signature;

a file length;
a product name.

5. The method according to claim 1 wherein said step of integrating the virus-free certificate in the file comprises the further steps of:
   appending the virus-free certificate to the file;
   modifying a file header, preferably:
   a non encrypted file signature;
   a file length;
   a product name, said product name comprising means for identifying the integrated virus-free certificate.

6. The method according to claim 1 wherein said step of determining whether the file is virus-free or not comprises the further step of:
   executing one or a plurality of anti-virus programs on said file for detecting viruses.

7. The method according to claim 1 wherein the virus-free certificate further comprises:
   a list of the one or plurality of anti-virus programs that have been executed on the file.

8. The method according to claim 1 wherein the virus-free certificate further comprises:
   a file identification;
   a virus-free certificate authority identification;
   a public key for decrypting the file signature;
   a certificate signature for authenticating the virus-free certificate.

9. The method according to claim 1 comprising the further steps of:
   identifying the server or client system where the file comprising the integrated virus-free certificate is stored;
   updating the file with the integrated virus-free certificate.

10. The method according to claim 1 wherein the step of generating a file signature comprises the further steps of:
    hashing the file to generate a file digest;
    encrypting the file digest using a private key.

11. A system implementing a virus-free certificate authority, said system comprising a processor that executes a program for implementing a method comprising the steps of:
    receiving a virus-free certificate request for a file from a server or a client system, said virus-free certificate request comprising the file for which the virus-free certificate is requested;
    determining whether a virus-free certificate is integrated in the file;
    if no virus-free certificate is integrated in the file:
    determining whether the file is virus-free or not;
    if the file is declared virus-free by the virus-free certificate authority:
    generating a virus-free certificate comprising a file signature for certifying that said file is declared virus-free by the virus-free certificate authority;
    integrating the generated virus-free certificate in the file;
    sending back in response to the virus-free certificate request the file with the integrated virus-free certificate.

12. A computer program recorded on a computer-readable medium and comprising instructions executing a method comprising the steps of:
    receiving a virus-free certificate request for a file from a server or a client system, said virus-free certificate request comprising the file for which the virus-free certificate is requested;
    determining whether a virus-free certificate is integrated in the file;
    if no virus-free certificate is integrated in the file:
    determining whether the file is virus-free or not;
    if the file is declared virus-free by the virus-free certificate authority:
    generating a virus-free certificate comprising a file signature for certifying that said file is declared virus-free by the virus-free certificate authority;
    integrating the generated virus-free certificate in the file;
    sending back in response to the virus-free certificate request the file with the integrated virus-free certificate.

13. A method, for use in a server or client system, of determining that a file is virus-free comprising the steps of:
    determining whether a virus-free certificate is integrated within a file;
    if a virus-free certificate is integrated within the file:
    authenticating the virus-free certificate, said virus-free certificate comprising a certificate signature;
    authenticating the file, said virus-free certificate comprising a file signature, said file signature certifying that said file has been declared virus-free by a virus-free certificate authority.

14. The method according claim 13 wherein said step of authenticating the file comprises the further steps of:
    decrypting the file signature using a public key comprised in the virus-free certificate;
    hashing the file to generate a file digest;
    comparing the decrypted file signature with the generated file digest.

15. The method according to claim 13 wherein the step of authenticating the virus-free certificate comprises the further step of:
    validating the virus-free certificate.

16. The method according to claim 15 wherein the step of validating the virus-free certificate comprises the further step of:
    determining whether the virus-free certificate is valid or not;
    if the virus-free certificate is not valid:
    requesting a virus-free certificate update or an updated virus-free certificate update to a virus-free certificate authority.

17. The method according to claim 13 wherein the virus-free certificate further comprises:
    a file identification;
    a virus-free certificate authority identification;
    a public key for decrypting the file signature.

18. The method according to claim 13 wherein said file further comprises:
    a file header comprising:
    a non encrypted file signature for signing the file;
    a file length;
    a product name, said product name comprising means for identifying the integrated virus-free certificate.

19. The method according to claim 13 wherein the step of determining whether a virus-free certificate is integrated within a file comprises the further step of:
    determining whether a product name within a file header comprises means for identifying the integrated virus-free certificate or not.

20. A system having a processor that determines that a file is virus-free, said processor executing a program for implementing a method having steps of:
    determining whether a virus-free certificate is integrated within a file;
    if a virus-free certificate is integrated within the file:
    authenticating the virus-free certificate, said virus-free certificate comprising a certificate signature;

authenticating the file, said virus-free certificate comprising a file signature, said file signature certifying that said file has been declared virus-free by a virus-free certificate authority.

21. A computer program recorded on a computer-readable medium and comprising instructions executing a method having steps of:

determining whether a virus-free certificate is integrated within a file;

if a virus-free certificate is integrated within the file:

authenticating the virus-free certificate, said virus-free certificate comprising a certificate signature;

authenticating the file, said virus-free certificate comprising a file signature, said file signature certifying that said file has been declared virus-free by a virus-free certificate authority.

22. A method, for use in a virus-free certificate authority, of generating a virus-free certificate certifying that a file is virus-free comprising the steps of:

receiving a virus-free certificate request for a file from a server or a client system, said virus-free certificate request comprising the file for which the virus-free certificate is requested and a list of one or a plurality of anti-virus programs to execute on the file to determine whether the file is virus-free or not;

determining whether a virus-free certificate is integrated in the file;

if no virus-free certificate is integrated in the file:

determining whether the file is virus-free or not;

if the file is declared virus-free by the virus-free certificate authority:

generating a virus-free certificate comprising a file signature for certifying that said file is declared virus-free by the virus-free certificate authority;

integrating the generated virus-free certificate in the file;

sending back in response to the virus-free certificate request the file with the integrated virus-free certificate.

* * * * *